United States Patent [19]

Masson et al.

[11] Patent Number: 4,953,398

[45] Date of Patent: Sep. 4, 1990

[54] METHOD AND APPARATUS FOR DETECTING ACOUSTIC VIBRATIONS IN A BOREHOLE

[75] Inventors: Jean-Pierre Masson, Richmond, Tex.; Jacky Bourseul, Saclay; Claude Fierfort, Lozere, both of France

[73] Assignee: Schlumberger Technology Corp., New York, N.Y.

[21] Appl. No.: 260,088

[22] Filed: Oct. 19, 1988

[30] Foreign Application Priority Data

Oct. 27, 1987 [FR] France .................. 87 14812

[51] Int. Cl.⁵ .............................. E21B 47/00
[52] U.S. Cl. .......................... 73/151; 73/526
[58] Field of Search .......... 73/151, 493, 526, 661, 73/866.5; 175/45; 367/25; 181/104

[56] References Cited

U.S. PATENT DOCUMENTS

| | | | |
|---|---|---|---|
| 1,388,545 | 8/1921 | Bohan | 175/45 |
| 2,739,297 | 3/1956 | Atanasoff et al. | 340/17 |
| 2,953,362 | 9/1960 | Thassy et al. | 175/45 |
| 3,191,141 | 5/1961 | Shuster | 340/17 |
| 4,103,533 | 8/1978 | Dinwiddie | 73/64 |
| 4,130,816 | 12/1978 | Vogel et al. | 340/15.5 |
| 4,289,025 | 2/1979 | Norel et al. | 73/152 |
| 4,549,630 | 10/1985 | Brown | 181/106 |
| 4,614,250 | 9/1986 | Panetta et al. | 181/102 |
| 4,617,516 | 10/1986 | Schenck | 324/307 |
| 4,703,459 | 10/1987 | Bower | 367/25 |
| 4,711,303 | 10/1987 | Koeling et al. | 166/250 |

FOREIGN PATENT DOCUMENTS

| | | |
|---|---|---|
| 0074317 | 3/1983 | European Pat. Off. . |
| 0138271 | 4/1985 | European Pat. Off. . |
| 0224285 | 10/1986 | European Pat. Off. . |
| 421978 | 3/1911 | France ............... 73/526 |
| 2448621 | 9/1980 | France . |

*Primary Examiner*—Hezron E. Williams
*Assistant Examiner*—Kevin D. O'Shea
*Attorney, Agent, or Firm*—Peter Y. Lee

[57] ABSTRACT

A method of measuring acoustic vibrations affecting the fluid in a well at a plurality of points which are angularly distributed around the axis of the well and which are in the proximity of the wall of the well by means of an apparatus including an elongate body which is rotatable about its longitudinal axis and having at least one acoustic vibration detector disposed at the end of an arm which is hinged to the body. The arm is moved away from the body so as to place its end at a determined distance from the wall of the well, and the arm is then caused to rotate continuously about the axis while simultaneously recording the signals produced by the detector. The method is suitable for use in a relief well to locate a well which is blowing out.

18 Claims, 2 Drawing Sheets

METHOD AND APPARATUS FOR DETECTING ACOUSTIC VIBRATIONS IN A BOREHOLE

TECHNICAL FIELD

The present invention relates to a method and to apparatus for measuring acoustic vibrations in a borehole.

BACKGROUND

The measurement of acoustic vibrations in a well can be used for localizing a source of noise, and in particular, such a technique can be used in relief well to locate a well that is blowing out. The relief well must be drilled towards the well that is blowing out, which means that it is necessary to determine the direction thereto by means of a device located in the relief well. The technique described in the documents mentioned below relies on the phenomenon of sound waves being generated by a well that is blowing out.

The apparatus described in U.S. Pat. No. 4,703,459 comprises two cylindrical transducers mounted in opposite directions and disposed at a given distance from each other. At the depth where a measurement is to be taken, the apparatus is turned through 360°, and the signals from the two transducers are processed in order to determine the direction of the source of noise. This technique is not sufficiently accurate.

The technique described in European patent applications No. 0 138 271 (corresponding to U.S. Pat. No. 4,711,303) and No. 0 224 285 consists in measuring acoustic vibrations at a given depth in a well at a plurality of points distributed angularly around the axis of the well, with the measurements being performed by a triaxial set of accelerometers placed against the wall of the well or at a short distance therefrom. The accelerometers are disposed at the ends of arms hinged relative to a body which is centered in the well, with the system of arms being rotatable about the well axis.

After each measurement, the system of arms is retracted in order to withdraw the accelerometers from the wall and then turned through a given angle, e.g. 10°, prior to being redeployed to bring the accelerometers back into contact with the wall or to bring spacer members mounted at the ends of the arms into contact with the wall, after which a further measurement is taken.

The time necessary for acquiring all of the measurement points at each given depth, e.g. 36 points in the above example, is extremely long: about two hours. This is an excessive amount of time in a situation where the target well is continuously blowing out fluids which are harmful or dangerous.

SUMMARY OF THE INVENTION

One aim of the invention is to considerably reduce the time necessary for overall data acquisition at a given depth, while providing an accurate dependable measurement.

In accordance with the present invention, there is provided a method of measuring the acoustic vibrations to which the fluid in a well is subjected, said measurments being performed at a plurality of points distributed angularly around the axis of the well and in the proximity of the wall of the well, said measurements being performed by means of an apparatus comprising an elongate body which is rotatable about its longitudinal axis and at least one acoustic vibration detector disposed at the end of an arm which is hinged to the body. The arm is moved away from the body so as to place its end at a determined distance from the wall of the well, and the arm is caused to rotate continuously about the axis while simultaneously recording the signals produced by the detector.

The invention makes it possible to acquire all of the measurements needed at a given depth in a few minutes. An additional advantage is that the density of measurement points may be very high since it depends on the way in which the signals from the detector are sampled. Another advantage of the invention is that it assures that all of the measurement points are situated on a circle centered on the axis of the body, even if the section of the well at the depth under consideration is oval.

Preferably, the arm is allowed to extend until making contact with the wall, and the arm is then retracted by a controlled quantity corresponding to obtaining said determined distance.

The invention also provides logging apparatus for measuring acoustic vibrations in a well, the apparatus comprising an elongate body which is rotatable about its axis, at least one arm constrained to rotate with the body and hinged thereto so as to be capable of moving away from the axis of the body until it comes into contact with the wall of the well, at least one acoustic vibration detector mounted at the end of an arm, means for centering the body relative to the well and actuator means for holding the arm during rotation in a position which is at a determined distance from the body, which position is closer to the axis of the body than is said contact position.

Other aspects and advantages of the invention will be apparent from reading the following description of a preferred embodiment given with reference to the accompanying drawings.

DESCRIPTION OF A PREFERRED EMBODIMENT

Figure 1:
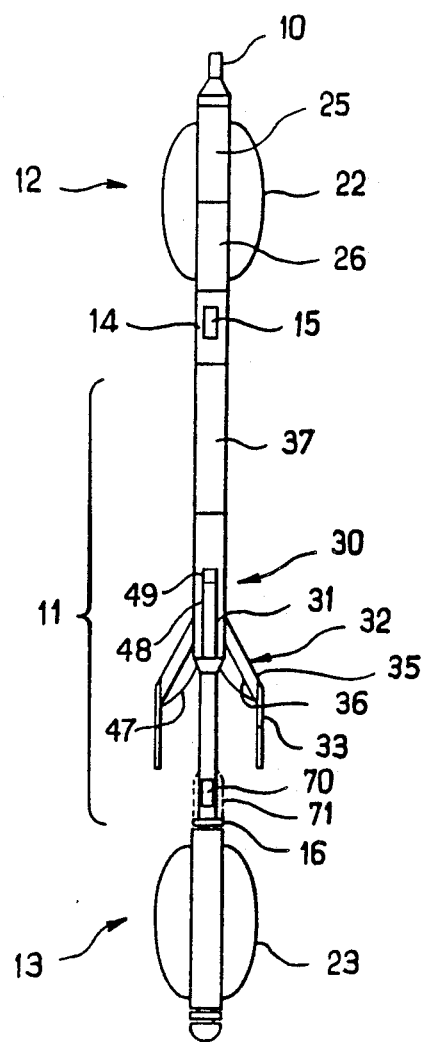
FIG. 1 is a diagrammatical overall view of a logging apparatus in accordance with the invention.

The logging apparatus shown in FIG. 1 is intended to determine the direction towards a source of noise which is external to a borehole down which the apparatus has been lowered. It is particularly intended to be lowered down a relief well in order to determine the direction towards a well that is blowing out. The apparatus is suspended from the end of a cable 10 which also serves to transmit control signals to the apparatus from surface equipment (not shown) and to transmit measurement signals produced by the sonde back to the surface equipment. In conventional manner, the surface equipment also includes means associated with the cable 10 for determining the depth at which the apparatus is situated at any given instant.

The apparatus includes an acoustic detection module 11 which is mounted to rotate about the longitudinal axis of the apparatus relative to a top portion 12 and a bottom portion 13 which are prevented from rotating. The module 11 is connected to top portion 12 for this purpose by means of a module 14 including a motor 15, and it is connected to the bottom portion via a rotary seal 16. Centralizers 22 and 23 are mounted on the top portion 12 and on the bottom portion 13, respectively. These centralizers hold the detection module 11 in a central position relative to the well. In addition, the forces by which the centralizers are pressed against the wall of the well are sufficient to ensure that the portions 12 and 13 cannot turn while the module 11 is being rotated by the motor 15.

The top portion 12 includes a telemetry module 25 which constitutes the interface between the sonde and the cable 10, and it also includes a module 26 containing means for measuring both the deviation of the axis of the sonde relative to the vertical, and the orientation of a reference plane passing through said axis relative to a direction such as magnetic north. Such means are known and comprise accelerometers and magnetometers for measuring deviation and orientation.

The acoustic detection module 11 comprises a detection sonde 30 in the form of an elongate body 31, a system of arms 32 hinged on the body and shown in the deployed position in FIG. 1, and measurement pads 33 mounted at the ends of the arms. The pads are suitable for coming into contact with the wall of the well and each of them carries at least one acoustic vibration detector. The pads 33 and the arrangement of the detectors is described in greater detail below with reference to FIGS. 2 to 4.

The system of arms 32 and the members for controlling displacements thereof are preferably of the type described in European patent application No. 0 074 317, and for more detailed explanation, reference should be made to said patent application.

It is merely mentioned here that the sonde has four pads 33 at 90° intervals around the body. Each pad is carried by a pair of arms, a main arm 35 and a secondary arm 36 which are hinged to the body 31 and which, together with the pad, constitute a parallelogram so that the pads are constrained to remain parallel to the axis of the body. For reasons of clarity, FIG. 1 only shows a single diametrically opposite pair of pads.

Spring blades 47 act on each pair of arms 35, 36 to urge the arms away from the body and to press the corresponding pads against the wall. A retraction mechanism 48 is mounted in the body and serves to fold the arms back down against the body.

The main arms 35 are coupled in diametrically opposite pairs so that opposite pads are always symmetrically deployed relative to the body. However, the two pairs of arms are independent from each other and as a result the two pairs are not constrained to be at the same distance from the body. In contrast, when the retraction mechanism is actuated, it acts in the same manner on both pairs of arms 35 and consequently brings the four pads simultaneously towards the axis of the body. The four pads are thus constrained to be at the same distance from the body during the retraction movement.

Further, sensors 49 detect the respective displacements of the two actuator rods mounted on the body and each linked with a corresponding one of the pairs of opposite arms 35. The signals produced by these sensors indicate the distance of each of the pairs of arms from the axis of the body, and when the pads are in contact with the wall, they indicate the size of the well across two perpendicular diameters.

The acoustic vibration detectors mounted on the pads 33 are advantageously uniaxial detectors and are preferably uniaxial accelerometers. It is preferable to provide two sets of three accelerometers which are sensitive to acceleration components along three respective directions X, Y, and Z (which accelerometers are referred to below simply as being X or Y or Z accelerometers), with each pair of accelerometers of the same type being mounted on opposite pads. The six accelerometers are distributed on the four pads in compliance with this condition. For example an X accelerometer and a Y accelerometer may be put on each pad of one opposite pair, with a Z accelerometer being put on each of the pads of the other pair.

Figure 2:
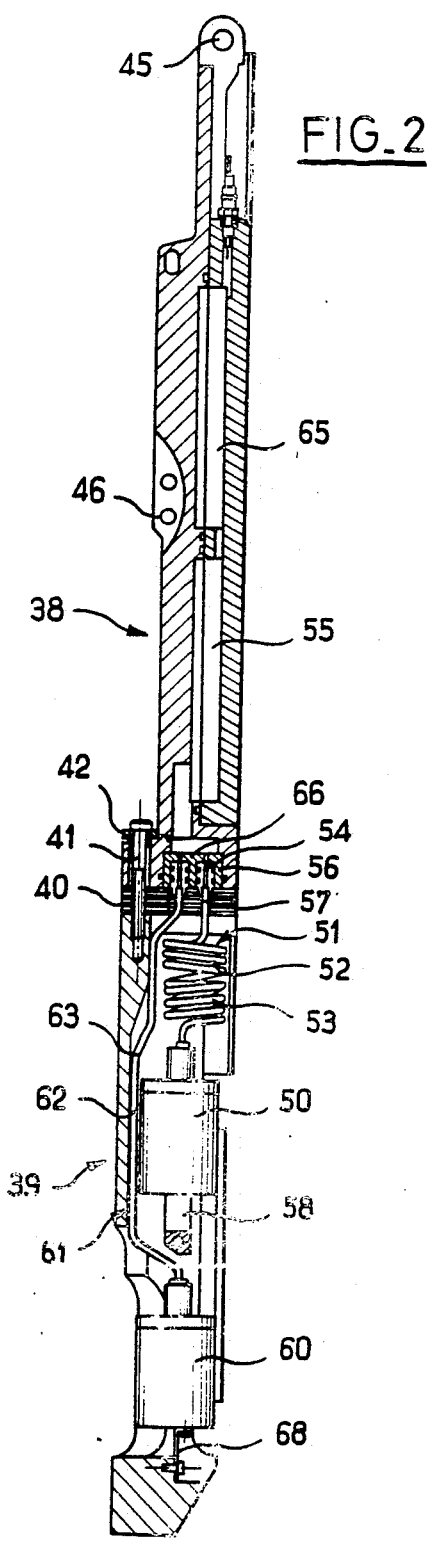
FIG. 2 is a longitudinal section view through a pad of the FIG. 1 sonde.

FIG. 2 thus shows a pad 33 having an X accelerometer 50 and a Y accelerometer 60. The pad 33 is divided into two portions: a top portion 38 having pivots 45 and 46 for connecting to the arms 35 and 36 respectively, and a bottom portion 39 which supports the accelerometers 50 and 60 which are exposed to the fluid in the well. The connection between the portions 38 and 39 is provided by a decoupling element 40 intended to prevent vibrations of the body 31 and of the arms 35 and 36 from being communicated to the bottom portion 39 and thus interfering with the measurements performed by the accelerometers. The decoupling element 40 is constituted in the present example by a stack of alternating layers of metal and elastomer. For the same reason, the fixing screws 41 interconnecting the top and bottom portions each have their shanks screwed into one of said portions and their heads engaging the other one of said portions via respective damping elements 42 preventing direct contact between the screw heads and the adjacent pad portions.

The top end of the accelerometer 50 is connected to a resilient suspension 51 made of a metal wire. The suspension 51 includes two adjacent helical portions 52 and 53 which are oppositely handed (as shown in FIG. 2) and of equal length. This arrangement has the effect of eliminating the rotary couple exerted by fluid pressure on the suspension 51. Each of the helical portions exposed to the fluid pressure behaves like a Bourdon tube and is subjected to a rotary couple which is a function of pressure and whose direction depends on the handedness of the helix. Since the portions 52 and 53 are subjected to couples of the same value and are of opposite handedness, the resultant couple on the suspension 51 is zero.

The metal wire constituting the suspension 51 is tubular and conveys a conductor which it protects from the fluid pressure, with the top end of the conductor being referenced 54. This conductor connects the accelerometer 50 to electronic circuits (not shown) disposed in a housing 55 formed in the top portion 38 of the pad. This housing is at atmospheric pressure with the connection taking place via a pressure-proof electricity feedthrough 56. The decoupling element 40 is provided for this purpose with a hole which is in alignment with the feedthrough 56 and is of such a size as to allow the top end 57 of the suspension 51 to pass therethrough and to hold it in position.

Figure 3:
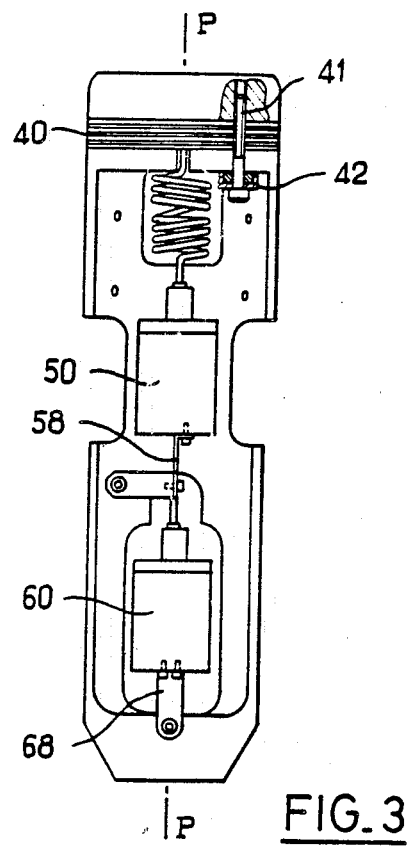
FIG. 3 is an elevation view of the bottom portion of the FIG. 2 pad.
Figure 4:
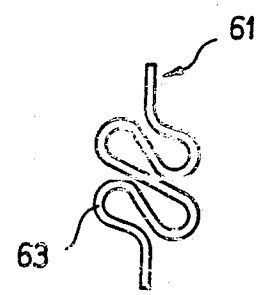
FIG. 4 shows details of the pad of the Y accelerometer suspension.

At its bottom end, the accelerometer 50 is connected to the pad by means of a metal blade 58 disposed in the mid-plane P-P of the pad (see FIG. 3). The blade 58 can vibrate only in the X direction which is perpendicular to its surface (i.e. perpendicular to the plane of the drawing in FIG. 2) and thus leaves the accelerometer 50 with only the desired degree of freedom.

In order to save space, the Y accelerometer 60 disposed below the accelerometer 50 has a suspension 61 which is differently shaped. This suspension has the same tubular wire as the suspension 51, however the wire has a retilinear portion 62 going past the accelerometer 50 together with a portion 63 having a plurality of zig-zag loops level with the suspension 51, thereby obtaining the desired decoupling effect. This portion 63 is shown in detail in FIG. 4. It may be observed that the wire constituting the suspension 61 has substantially the same total length as the wire constituting the suspension 51.

As for the accelerometer 50, the tubular suspension-forming wire 61 conveys a conductor which is connected via a feedthrough 66 to an electronic module disposed in a housing 65 in the top portion of the pad.

The bottom end of the accelerometer 60 is connected to the pad by means of a metal blade 68 which is disposed perpendicularly to the blade 58 of the accelerometer 50 and which is suitable for vibrating solely in the Y direction. The accelerometer 60 is thus sensitive solely to accelerations in the Y direction.

The electronic circuits received in the pad serve as preamplifiers for the signals produced by the accelerometers. More comprehensive processing is performed in an electronics cartridge 37 located in the module 11 between the sonde 30 and the rotation module 14.

The pads carrying the Z accelerometers (not shown) are suitably made like the pad 33 shown in FIG. 2, i.e. each of them has a top portion with the electronic circuits, a bottom portion carrying the accelerometer, and an intermediate decoupling element identical to the element 40. The Z accelerometer is preferably supported by a suspension identical to the suspension 51 and constituted by a tubular wire with oppositely handed helical portions. An arrangement of blades analogous to the blades 58 or 68 leaves the accelerometer a single degree of freedom in the Z direction, i.e. the direction parallel to the axis of the sonde body.

Returning to FIG. 1, the module 11 includes a hydrophone 70 mounted on the axis of the body 31 and constrained to rotate with the body. In the example shown, the hydrophone 70, is located in the bottom portion of the module 30, in side a housing 71. As shown diagrammatically in FIG. 1, the housing 71 is made in the form of a conventional housing for an acoustic logging device of the type described in U.S. Pat. No. 3,191,141, i.e. it includes a series of slots setting up discontinuities in the longitudinal direction. The signal produced by the hydrophone 70 serves to normalize the signals produced by the accelerometers. An omnidirectional hydrophone is appropriate.

The logging apparatus described above is used, in accordance with the invention, as follows. With the system of arms 32 in the retracted position, the apparatus suspended from the cable 10 is put at a depth at which measurements are to be performed. The arms are released by switching off the action of the retraction mechanism. The springs then spread the arms away from the body 31 until the pads 33 come into contact with the wall of the well. The retraction mechanism is then actuated so as to displace the pads 33 away from their contact position and to fix them at a given distance from the axis of the body. This result is obtained by the measurements which are continuously produced by the above-mentioned displacement sensors associated with the actuator rods for the arms 35. These measurements of the extension of the pads 33 are used to interrupt the retraction movement when the distance of the pads from the axis as measured by the sensors is equal to an appropriate reference value.

In general, determining the direction of a noise source is made easier when the accelerometers are as close as possible to the walls of the well. In contrast, it is essential to obtain uniform rotation and to avoid any risk of a pad coming into contact with the wall while it is rotating. This means that a safety margin is necessary and the size of the safety margin depends on the conditions in the well at the depth under consideration.

With the pads 33 being held at a short distance away from the walls of the well, the motor 15 of the rotation module is switched on so as to cause the detection module 11 to rotate at constant speed. While the module is rotating, the accelerometers are used to detect the intensity of the acoustic vibrations to which the fluid in the well is subjected in the vicinity of the wall, and the accelerometer measuements are continuously recorded. Simultaneously the signal produced by the hydrophone 70 is also continuously recorded with the hydrophone rotating synchronously with the accelerometers since it is constrained to rotate with the body 31. This signal serves to normalize the signals produced at the same instants by the accelerometers. The complete turn required for obtaining a polar diagram for each accelerometer takes very little time: about two minutes.

Before raising the apparatus or displacing it to another depth, the retraction mechanism is actuated in order to fold the arms down completely, thereby placing the pads along the body 31.

A preferred embodiment of the invention has been described. It will be evident to the reader that numerous modifications and variations can be made by persons skilled in the art without going beyond the scope of the invention.

What is claimed is:

1. A method of measuring the acoustic vibrations to which the fluid in a borehole is subjected, using a borehole apparatus comprising a body which is rotatable with respect to said apparatus, an arm hingedly connected to said body, and at least one acoustic vibration detector disposed at the end of said arm, the method comprising the steps of (1) moving the arm away from the body so as to place its end at a determined distance from the wall of the borehole, and (2) causing the arm to rotate continuously about the axis while simultaneously recording the signals produced by the detector.

2. A method according to claim 1, wherein the arm is moved away from the axis until it comes into contact with the wall, after which the arm is retracted by a controlled amount to reach said determined distance.

3. A method according to claim 1, wherein two measurements are performed simultaneously by means of identical detectors mounted on respective arms disposed at 180° to each other.

4. A method according to claim 1, wherein the acoustic vibrations are measured by means of at least one set of three uniaxial accelerometers which accelerometers are sensitive to acceleration components along three respective orthogonal directions.

5. A method according to claim 1, wherein the acoustic vibrations are also measured at a point situated substantially on the axis of the borehole, with these measurements serving to normalize the measurements of the detector.

6. Logging apparatus for measuring acoustic vibrations in a borehole, comprising an elongate borehole instrument including a body which is rotatable about the longitudinal axis of the elongate borehole instrument, at least one arm constrained to rotate with the body and hinged thereto so as to be capable of moving away from said axis until it contacts the wall of the borehole, at least one acoustic vibration detector mounted at the end of said arm, means for centering the body relative to the borehole, and actuator means for holding the arm during rotation at a fixed distance from the body, said fixed distance being less than the distance corresponding to said arm contacting the borehole wall.

7. Apparatus according to claim 6, wherein the actuator means comprise resilient means urging the arm away from the axis of the body, a drive member for displacing the arm towards the axis against the action of the resilient means, and means for measuring the distance between the arm and the axis of the body, with said measured distance being used for controlling said drive member.

8. Apparatus according to claim 7, further comprising a plurality of arms hingedly disposed about said body, and means for displacing the arms simultaneously towards the axis of the body when the drive member is activated.

9. Apparatus according to claim 7, wherein said arm has a pad at its end, said pad being parallel to said axis, and having a contact surface for coming into contact with the wall of the borehole.

10. Apparatus according to claim 9, wherein said pad comprises a fixed portion which is connected to said arm, a detector-carrying support portion, and means for mechanically decoupling said fixed and support portions.

11. Apparatus according to claim 8, wherein the system of arms comprises four arms disposed at 90° intervals around the axis of the body.

12. Apparatus according to claim 11, wherein diametrically opposite arms support detectors which are identical in type.

13. Apparatus according to any one of claims 6 to 9, wherein at least one detector is supported by a resilient suspension made of two helical portions in endwise arrangement having reversed directions of winding, said portions having the same length.

14. Apparatus according to claim 10, wherein said means for mechanical decoupling comprises a resilient suspension which supports said detector and is made from a tubular wire capable of withstanding pressure and enclosing an electrical conductor to the detector.

15. Apparatus according to claim 14, wherein said means for mechanical decoupling includes a passage for the top end of said suspension.

16. Apparatus according to claim 15, wherein the detectors are uniaxial accelerometers.

17. Apparatus according to claim 16, further including a hydrophone placed substantially on the axis of the elongate borehole instrument.

18. A resilient suspension for an acoustic vibration detector placed in a fluid, comprising two helical portions in endwise arrangement having reversed directions of winding, said portions having the same length, said portions being made of a tubular wire capable of withstanding pressure and having routed therein an electrical conductor provided for connection to the detector.

* * * * *